United States Patent [19]

Jones et al.

[11] Patent Number: 4,476,234

[45] Date of Patent: Oct. 9, 1984

[54] REFRACTORY CEMENT

[75] Inventors: Cecil M. Jones, Worcester; Malcolm E. Washburn; Louis J. Trostel, Jr., both of Princeton, all of Mass.

[73] Assignee: Norton Company, Worcester, Mass.

[21] Appl. No.: 522,916

[22] Filed: Aug. 12, 1983

[51] Int. Cl.³ .............................................. C04B 35/58
[52] U.S. Cl. ........................................ 501/89; 501/92; 501/97; 501/98; 501/123; 501/133
[58] Field of Search ............... 501/89, 92, 97, 98, 501/123, 133

[56] References Cited

U.S. PATENT DOCUMENTS

| | | | |
|---|---|---|---|
| 2,559,343 | 7/1951 | Caton | 106/44 |
| 3,193,399 | 7/1965 | Washburn | 106/44 |
| 3,639,101 | 2/1972 | Washburn | 23/203 |
| 3,679,444 | 7/1972 | Washburn | 106/55 |
| 3,846,144 | 11/1974 | Parsons et al. | 106/56 |
| 3,960,581 | 6/1976 | Cutler | 106/65 |
| 4,060,424 | 11/1977 | Hofmann | 106/55 |
| 4,093,470 | 6/1978 | Cherry | 106/56 |
| 4,331,771 | 5/1982 | Washburn | 501/97 |

*Primary Examiner*—James Poer
*Attorney, Agent, or Firm*—Arthur A. Loiselle, Jr.

[57] ABSTRACT

A novel raw batch and improved fired refractory cement is described. A bulk refractory grain mass is initially bonded with a fired bond, which upon being fired includes $Si_3N_4$ and/or $Si_2ON_2$ reaction component that better protects the ultimate high temperature sintered cement product from erosion when the cement is used as a liner for furnace walls, troughs, and runners that contain a flow of molten iron or slag, as well as induction furnaces which process corrosive slag.

17 Claims, No Drawings

REFRACTORY CEMENT

TECHNICAL FIELD

This invention relates to a dry packed ramming cement for furnaces and which is particularly suitable for blast furnace walls, troughs and the like, adapted to be vibrated or otherwise rammed into place and fired in situ.

BACKGROUND ART AND INFORMATION DISCLOSURE STATEMENT

The following publications are representative of the most relevant prior art known to the Applicant at the time of the filing of this application:

| United States Patents | | |
|---|---|---|
| 2,559,343 | Caton | July 3, 1951 |
| 3,193,399 | Washburn | July 6, 1965 |
| 3,639,101 | Washburn | February 1, 1982 |
| 3,679,444 | Washburn | July 25, 1972 |
| 3,846,144 | Parsons et al | November 5, 1974 |
| 3,960,581 | Cutler | June 1, 1976 |
| 4,060,424 | Hofmann | November 29, 1977 |
| 4,093,470 | Cherry | June 6, 1978 |
| 4,331,771 | Washburn | May 25, 1982 |

All of the above listed patents, Caton, Parsons et al, and Cherry, show various compositions useful as refractory cements or the like. Caton describes an alumina and silica refractory wherein a small amount of a mineralizer such as calcium oxide is used to encourage the growth of a bonding mullite. The Parsons et al patent describes the combination of an essentially graphite-alumina gunnable cement having an oxidation resistant bond wherein silicon is used to form one of the bonding components upon firing the composition in place. The silicon is fired together with the refractory mix which includes calcium aluminate and calcium silicate to bond the bauxite-graphite containing composition, wherein the bauxite may include an iron oxide component.

Cherry shows an alumina refractory bonded with a volatilized or fumed silica binder. In this patent the silica content is prepared in an acid slurry and is then mixed with the refractory component in order to promote a solution of at least a part of the silica in the water to enhance its bonding properties. After this step the mixture is then formed, rammed, or gunned, and fired.

The Washburn patents and the Cutler disclosure are of general relation to this invention for disclosing various aspects of the chemistry of the silicon nitride, silicon oxynitride reaction product used in the ramming cement herein disclosed. The Cutler teaching relates more particularly to a silicon nitride bond for an alumina containing refractory material.

The Hofmann patent shows a ramming cement within the field of this invention and, as such, its disclosure is incorporated herein by reference. This patent describes the preparation of a raw batch for such a cement having a large percentage of refractory grains including alumina, silicon carbide and the like, together with a low temperature setting bond of borosilicate glass, silicon oxide, and boron oxide. The low temperature bond may also include some alumina, silica, potassium oxide, calcium oxide, boric acid, zinc oxide, phosphorous pentoxide, zirconium oxide, titanium oxide and/or an inorganic fluorine compound. The low temperature bond sets within a range of between 350° C. to 800° C. to hold the refractory grains within a monolithic structure which retains its integrity up to and through the elevated range of temperatures at which the refractory grains sinter and other high temperature ceramic bonds form.

The present invention is an improvement on the Hofmann type of cement and provides a novel low temperature setting bond that includes a mixture of fumed silica, iron oxide, silicon powder, and calcium carbonate. When the low temperature bond is fired in a nitrogen or reducing atmosphere containing nitrogen, the silicon in the bond is converted to a silicon nitride and/or silicon oxynitride component that is distributed through the mass of the resulting cement to protect the mass from the attack of molten iron and slag flowing in troughs and runners lined with this composition.

This bond is particularly suitable to use for forming nitrides in situ during the initial sinter and as the cement is used. Iron oxide is a catalyst for the nitridation of silicon, and fumed silica and calcium oxide catalyze the reaction to form silicon oxynitride. In addition, these oxides combine with the boric acid to form a low temperature bond, and then catalyze the nitride reaction with silica.

DISCLOSURE OF THIS INVENTION

This invention is a refractory material resulting from firing a raw batch formulation that is particularly adapted for use in lining the walls and main trough in iron and slag runners of blast furnaces. A wide range of refractory grains or aggregate materials including fused and calcined alumina together with silicon carbide, mullite, kyanite and the like are mixed with bond ingredients designed to develop a sintered ceramic product after the raw batch is fired in situ in furnace walls, troughs, blocks or dams, and runners. The rammed or otherwise placed raw batch ingredients are fired in a nitrogen or reducing atmosphere containing nitrogen (such as is usually found in actual usage) to develop a reacted product that is particularly adapted for this use because of its strength and particular resistance to erosion by molten slag and iron.

The essential bond ingredients used in the raw batch formulation of this cement include fumed silica, iron oxide, silicon powder, calcium carbonate (or other source of CaO) as well as an optionally selected sintering aids adapted to lower the initial sintering temperature for the cement which makes up about 2% to about 20% of the cement. When this bond composition is fired in a nitrogen or nitrogenous reducing atmosphere a nitride or oxynitride of silicon results which together with the other components of the bonding mix provides an unexpectedly strong and inert bond composition that is a reacted cement having excellent hot strength and resistance to erosion. The amounts and types of nitrides produced will depend on the temperature and composition of the atmosphere to which the cement is exposed.

With respect to the refractory grain, the major constituent of the cement composition, it may be a mixture of alumina, silicon carbide, mullite, and kyanite. The alumina may be either fused or calcined but preferably the bulk of the mix is a dark fused alumina crushed to pass through a 6 mesh, U.S. Standard Sieve, and to be as fine as 20 mesh and finer. Silicon carbide in a size range of 90 mesh and finer together with Bayer alumina having a particle size in the range of 325 mesh and raw kyanite screened through 300 mesh form the preferred aggregate mixture but other inert refractory grains may also be used such as mullite and the like. These aggregate refractory components of the cement product are selected to have a size range as is known to achieve a desired dense packing which, when bonded with the fired reacted bond mix, forms a relatively impermeable mass well adapted to be sintered to contain the molten iron and slag flows.

The bond mixture is formed of particles falling within a range of from 0.01 to 74 microns and is designed to be homogenously mixed throughout the larger mass of refractory grains. The bond mix may contain a low temperature curing organic polymer such as a phenol-formaldehyde resin and sintering aids such as boric acid and potassium fluoborate. The bond is mixed with the bulk of the refractory grains in a volume sufficient to substantially fill the voids between the bulk refractory grains whereby to produce the maximum desired cementing action and highly dense reacted mass. The raw batch is an intimate mixture of the bond composition and refractory grains which upon being fired has been found to sinter to provide a body having excellent hot strength and improved resistance to erosion from molten iron and slag flow as compared with conventionally known cements used for this purpose heretofore.

The refractory grain or aggregate of a preferred cement of this invention includes an intimate mixture of dark fused aluminum oxide such as ALUNDUM, sold by Norton Company, crushed to fall within a size range of from 6 to 20 mesh and finer on the U.S. Standard Sieve scale together with silicon carbide sized to fall within a range of 90 mesh and finer, Bayer alumina of 325 mesh and raw kyanite screened through 200 mesh. The bulk ingredients may be present in a range of from about 80% parts by weight of the total raw batch to as much as about 98%. The remainder of the raw batch is the low temperature bonding mixture. All cement formulations are expressed in % by weight unless otherwise indicated.

The bond mixture includes fumed silica (or other fine silica) in a range of from 0.5% to 4.0% parts by weight of the total batch, a source of iron oxide 0.2% to 2%, silicon powder 1% to 10%, a source of CaO in an amount of from 0.1% to 1.0% and an optional sintering aid such as boric acid present in an amount of up to 2%. The most preferred bond formulation is 2.5% fumed silica, 1.25% iron oxide, 5.63% silicon, 0.62% calcium carbonate, and about 1% boric acid.

EXAMPLES OF THE PREFERRED EMBODIMENTS

Example 1

| | | | Ingredient as % of parts by weight of total raw batch of cement | |
|---|---|---|---|---|
| Bond Ingredients | | | | |
| Fumed SiO$_2$ | | | 1.0 | 1.0 |
| Iron oxide, Fe$_2$O$_3$ | | | 0.5 | 0.5 |
| Silicon powder | | | 2.25 | 2.25 |
| Calcium Carbonate | | | 0.25 | 0.25 |
| Boric Acid | | | — | 1.00 |
| Bulk Refractory Ingredients | | | | |
| Dark Fused Alumina | 6/16 | mesh | 22 | 21 |
| Dark Fused Alumina | 13/16 | mesh | 21 | 21 |
| Dark Fused Alumina | 20 F | mesh | 29 | 29 |
| Silicon carbide | 90 F | mesh | 14 | 14 |
| Bayer Alumina | 325 F | mesh | 5 | 5 |
| Raw Kyanite | 200 F | mesh | 5 | 5 |

The above intimate mixtures of bond and refractory grains were packed and fired in a nitrogenous reducing atmosphere at a temperature of 1100° C. to first react the low temperature bonding ingredients and then to form a bond including a Si$_3$N$_4$ component as shown by an X-ray analysis estimated to be 2% of the bond. Samples of the two fired products were compared to a commercial cement sold by Norton Company and found to have hot modulus of rupture at 1370° C. ranging from 330 psi to 760 psi as compared to 80 to 250 psi for the commercial cement. In more detail, the above fired cement compositions were evaluated against the commercial material for their resistance to erosion by molten cast iron and lime/silica slag in the following manner:

A small induction furnace measuring 17.78 cm (7 inches) in inside diameter and 30.48 cm (12 inches) deep was lined with refractory made of the above compositions. About 12.7 cm (5 inches) of the depth of the furnace was filled with cast iron and the iron heated to 1600° C. To the molten iron was added 0.23 kg (0.5 pound of a lime-silica slag having a CaO/SiO$_2$ ratio of about 1. The furnace run was continued for 5 hours with the old slag being removed and replaced by an equal amount of fresh slag every 0.5 hour of the five hours. After the 5 hour run the furnace was completely emptied and allowed to cool. The refractory lining of the furnace was removed and the wear or erosion of the thickness of the refractory wall was measured both where the iron and the slag had contacted the wall during the heating run.

It can be estimated from this test that the erosion of the cements in Example 1, in terms of mm of wear per 1000 tons of fluid flow tapped from a blast furnace would be, when no sintering aid is present, 2.7 to 2.9 mm with molten slag and 0.2 to 0.1 mm when exposed to molten iron, and with the boric acid present 2.0 to 2.4 mm resulted with the slag and 0.05 with the iron. By comparison, the standard commercial product exhibited an erosion of 2.1 to 3.6 mm and 0.2 to 0.6 mm from slag and iron respectively. These data clearly show the very substantial superiority of the cements of the present invention as compared to the commercial product.

Additional examples of the cement of the present invention were prepared and tested for their resistance to erosion, in the same manner as set out above. Various amounts of the invention bond were evaluated, as were the presence and absence of 1% boric acid, with respect to the effect of each variable on the slag erosion rate and/or hot strength.

Examples 2 through 7 involved cements of the same compositions as the 1% boric acid containing and non-acid containing cements of Example 1. Test samples of the fired liner were flexurally tested under 3 point loading at various elevated temperatures with the following results:

| Example No. | Hot Modulus of Rupture in psi | | |
|---|---|---|---|
| | Temp °C. | No Acid | 1% Acid |
| 2 | 200 | 900 | 900 |
| 3 | 300 | 400 | 400 |
| 4 | 500 | 50 | 250 |
| 5 | 800 | 400 | 400 |
| 6 | 1100 | 800 | 350 |
| 7 | 1400 | 400 | 250 |

The presence of 1% boric acid improved the hot modulus of rupture in the 400°-700° C. temperature range because it brought about better bonding in that temperature range.

Examples 8-14 were of the same basic composition (with respect to both bond and grain) as the boric acid-containing cement of Example 1 with the amount of bond relative to the amount of grain or aggregate varied from 2% by weight to 14% by weight. The various cement formulations were fired as above and evaluated for resistance to slag erosion and hot modulus of rupture, the latter measured at 1370° C. under 3 point loading. The results were as follows:

| Example No. | Wt. % Bond | Slag Wear Rate* | Modulus of Rupture psi** |
|---|---|---|---|
| 8 | 2 | 4.1 | 130 |
| 9 | 4 | 3.4 | 160 |
| 10 | 6 | 3.2 | 190 |
| 11 | 8 | 2.9 | 350 |
| 12 | 10 | 2.8 | 420 |
| 13 | 12 | 2.6 | 420 |
| 14 | 14 | 2.5 | 420 |

*mm of wear per 1000 tons of iron tapped from furnace.
**measured at 1370° C.

The slag and iron erosion properties reached an optimum in the range of 8-10% bond as did the hot strength measured at 1370° C.

The above description is based on the best mode known to the inventors at the present time, and is not to be considered limiting. The product of this invention is a raw batch adapted to be fired to produce a more satisfactory refractory for use in furnaces containing molten iron or slag, including troughs, runners, and the like, associated with blast furnaces as well as the walls thereof. The ultimate reacted product has improved strength and is more resistant to erosion than any similar product known to the inventors.

What is claimed is:

1. A refractory cement adapted to be fired in situ, said cement containing a major proportion of refractory grain, wherein the improvement comprises: a bond for said grain comprising a mixture of fine silica, a source of iron oxide, silicon powder, and a source of calcium oxide.

2. A refractory cement as in claim 1 wherein said refractory grain is a mixture of alumina, silicon carbide, mullite and kyanite in a total amount of from 80% to 98%, and said bond is present in an amount of 2% to 20%.

3. A refractory cement as in claim 1 wherein said bond also includes a boric acid component.

4. A refractory cement as in claim 1 composed of 90% of refractory grain and 10% of said bond mixture.

5. A refractory cement as in claim 1 wherein said bond also includes a minor proportion of a material selected from the group consisting of boric acid, potassium fluoborate, organic polymer and mixtures thereof.

6. A refractory cement as in claim 1 composed of 90% of refractory grain, 9% of said bond mixture and 1% of an ingredient selected from the group consisting of boric acid, potassium fluoborate, organic polymer and mixtures thereof.

7. A refractory cement as in claim 1 wherein said refractory grain includes 77% alumina, 14% silicon carbide, and 5% kyanite.

8. A refractory cement as in claim 7 wherein said refractory grain includes 22% of fused alumina grains size of through 6 and on 16 mesh, 21% of fused alumina grains size of through 12 and on 16 mesh and 29% of fused alumina grains 20 mesh and finer; together with 14% of silicon carbide grains 90 mesh and finer; 5% of Bayer alumina 325 mesh and finer and 5% of raw kyanite 200 mesh and finer.

9. A refractory cement as in claim 1 wherein said refractory cement includes 72% of a fused alumina, 14% of a silicon carbide, 5% of a Bayer alumina, 5% of a raw kyanite, 1% of a fumed silica, 0.5% of an iron oxide, 2.25% of silicon powder, and 0.25% of calcium carbonate.

10. A refractory cement as in claim 5 wherein said refractory cement includes 71% of a fused alumina, 14% of a silicon carbide, 2% of a Bayer alumina, 2% of a raw kyanite, 2.5% of fumed silica, 1.25% of an iron oxide, 5.62% of a silicon powder, 0.63% of calcium carbonate, and 1% of a material selected from the group consisting of boric acid, potassium fluoborate, an organic polymer and mixtures thereof.

11. A refractory cement fired in place as linings in furnaces, and the like comprising a major proportion of grains of alumina, silicon carbide, mullite and kyanite, and a minor proportion of a bond that is formed as the reaction product resulting from firing a mixture of bonding ingredients comprising fine silica, a source of iron oxide, silicon powder and a source of calcium oxide.

12. A refractory cement as in claim 11 wherein said grains prior to firing include dark fused alumina, silicon carbide, Bayer alumina, and raw kyanite, and said bond prior to firing is a mixture of fumed silica, iron oxide, silicon powder, and calcium carbonate.

13. A refractory cement as in claim 11 wherein said bond includes a silicon nitride and/or silicon oxynitride component in the reacted bond.

14. A refractory cement as in claim 13 wherein said reacted bond includes at least 2% of $Si_3N_4$ and/or silicon oxynitride dispersed throughout the fired bond.

15. A refractory cement as in claim 11 wherein said bond includes ingredients to lower the initial sintering temperature, selected from the group consisting of boric acid, potassium fluoborate, an organic polymer and mixtures thereof.

16. A refractory cement as in claim 11 having a hot modulus of rupture at 1370° C. of at least 300-500 psi.

17. A refractory cement as in claim 15 having a hot modulus of rupture at 1370° C. of at least 300-500 psi.

* * * * *